United States Patent [19]
Scarpa et al.

[11] Patent Number: 5,992,230
[45] Date of Patent: Nov. 30, 1999

[54] DUAL ROTOR FLOW METER

[75] Inventors: Thomas J. Scarpa, deceased, late of Edinboro, Pa., by Alice Scarpa, legal representative; Kenneth R. Hoffer, Hertford; Robert Hayman, Elizabeth City, both of N.C.

[73] Assignee: Hoffer Flow Controls, Inc., Elizabeth City, N.C.

[21] Appl. No.: 08/971,229

[22] Filed: Nov. 15, 1997

[51] Int. Cl.[6] .................................................. G01F 3/04
[52] U.S. Cl. ........................................ 73/261; 418/206.5
[58] Field of Search ................................ 73/261, 861.77, 73/861.79; 418/206.5, 206.2

[56] References Cited

U.S. PATENT DOCUMENTS

| | | | |
|---|---|---|---|
| 2,719,001 | 9/1955 | Knuth | 230/141 |
| 3,130,682 | 4/1964 | Meads | 103/126 |
| 3,748,903 | 7/1973 | Irie et al. | 73/261 |
| 3,810,723 | 5/1974 | Johnson | 418/205 |
| 3,842,672 | 10/1974 | Schneider, Jr. | 73/261 |
| 4,215,977 | 8/1980 | Wetherston | 418/1 |
| 4,295,369 | 10/1981 | Wendelboe | 73/261 |
| 5,027,653 | 7/1991 | Foran, Jr. | 73/253 |
| 5,152,684 | 10/1992 | Steffens | 418/150 |
| 5,559,288 | 9/1996 | Schumacher | 73/261 |

*Primary Examiner*—Richard Chilcot
*Assistant Examiner*—Jewel V. Thompson
*Attorney, Agent, or Firm*—Coats & Bennett

[57] ABSTRACT

A positive displacement flow meter includes a pair of smooth oval shaped rotors mounted to a pair of spaced apart rotatable shafts contained within a sealed housing. The rotatable shafts penetrate the measuring chamber and have a pair of toothed, oval shaped timing gears located in a separate gear cavity chamber which are responsible for synchronizing and maintaining the relative orientation of the smooth faced rotors with respect to one another. The fluid that is being metered forms seals between the rotating surfaces of the rotors, as well as between the rotors and the wall of rotor chamber, thus the inlet and outlet plenums are physically isolated and are consequently not in direct communication at any point during the rotation cycle of the rotors. Thus, each rotation of the rotors results in the transport of a precise and known volume of fluid from the inlet plenum to the outlet plenum. A magnetic sensing/counting system, which includes an magnetic actuator attached to one of the rotor shafts and a magnetic sensor mounted to the flow meter housing, monitors the rotation rate of the rotors and hence the flow rate of the fluid passing through the meter.

29 Claims, 5 Drawing Sheets

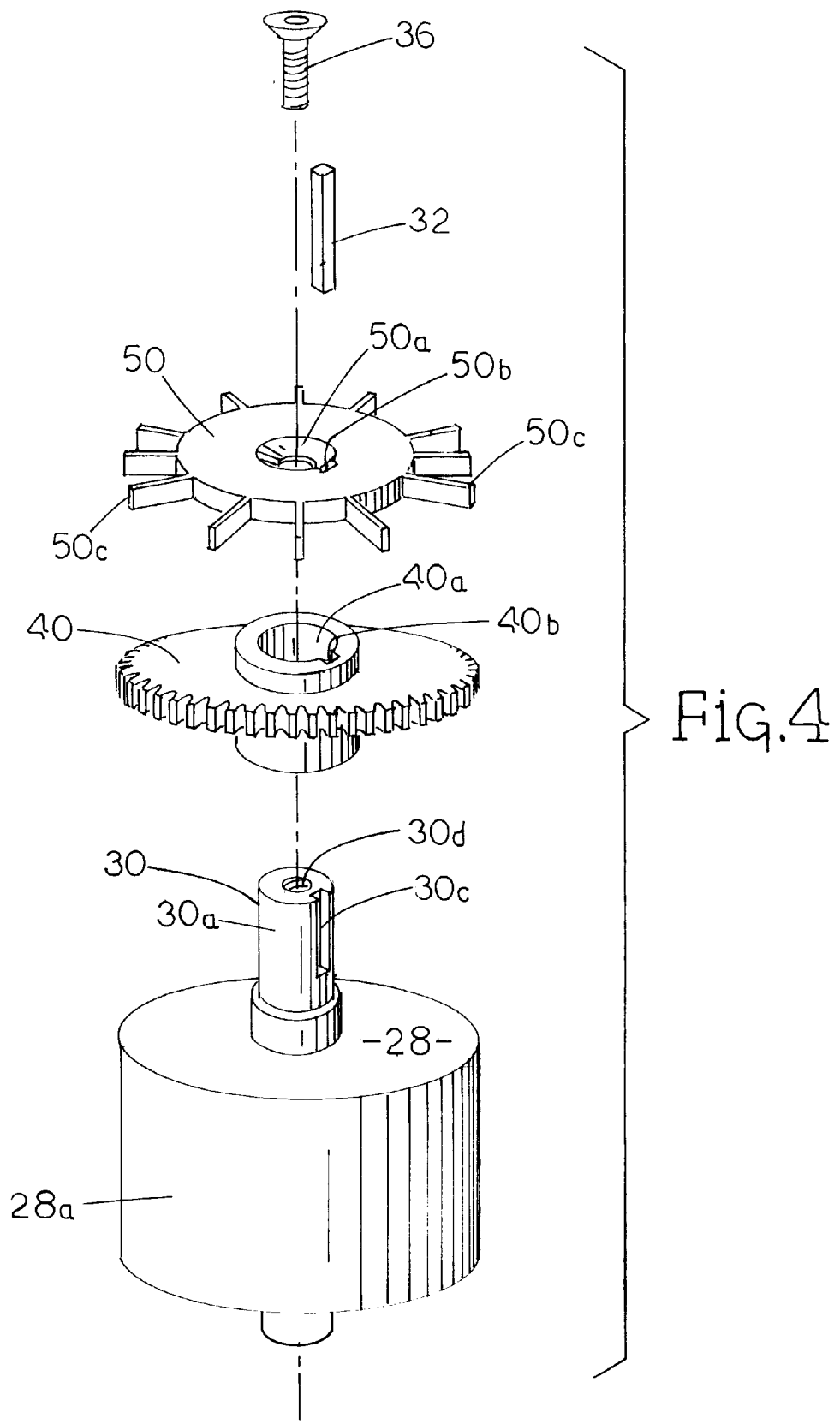

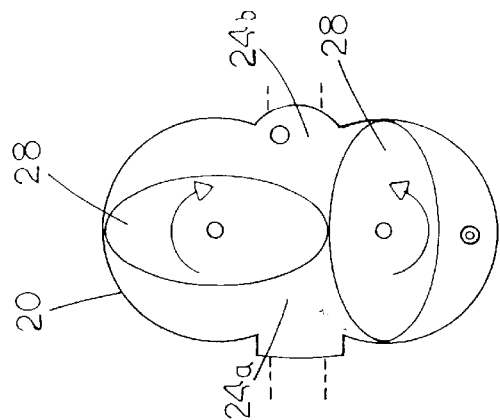
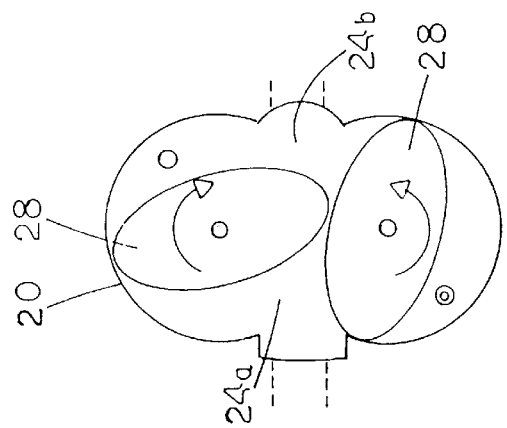
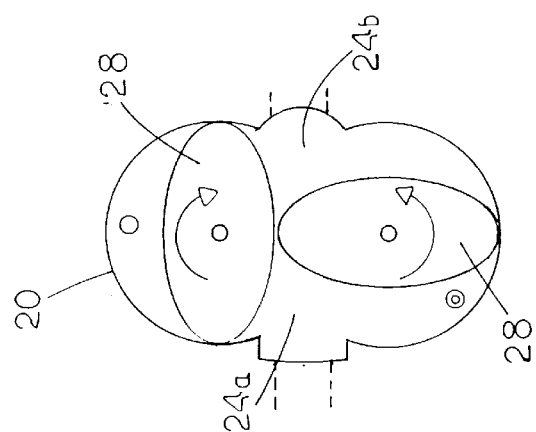
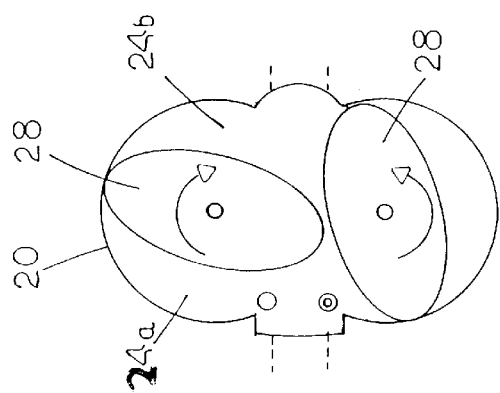

DUAL ROTOR FLOW METER

FIELD OF THE INVENTION

The present invention relates to meters for the measurement of fluid flow, and more particularly to a positive displacement type meter which utilizes a pair of oval shaped toothless rotors contained within a sealed housing for measuring the rate of fluid flow therethrough.

BACKGROUND OF THE INVENTION

Positive displacement, oval rotor type flow meter designs are well known and have been employed successfully in a number of industries including the petrochemical, power, gas, food, and beverage industries. Their popularity is due, in part, to the fact that their measurement accuracy does not depend on intricately shaped cams which can become misaligned, as is the case with sliding vane type positive displacement flow meters. Furthermore, unlike nutating disc type flow meters, the calibration factor does not vary with the viscosity of the fluid being metered.

In the case of oval type flow rate meters, a pair of oval shaped gear toothed rotors are used to sweep out a precisely known volume of the fluid passing through a measurement chamber during each rotor rotation cycle. In general, the rotors are positioned relative to one another in the chamber such that the gear teeth disposed on their surfaces mesh together at the point of articulation, and remain as such during the entire rotation cycle. It should be noted, however, that ideally none of the fluid being metered actually passes directly between the gear teeth themselves. The intermeshed nature of the gear teeth, in combination with the inherent viscosity of the fluid being metered, is intended to prevent the flow of fluid between the two articulating rotor surfaces. Instead, the metered fluid is swept out in the precisely measured pocket created by the oval shape of the rotor and the inner chamber wall as the rotors rotate about their respective shafts.

In general, as the viscosity of the metered fluid increases the accuracy obtainable by the flow meter also increases, due to a reduction in the ability of the fluid to seep between and through the intermeshed gear teeth of the two articulating rotors. However, in practice, even with higher viscosity fluids, a certain amount of fluid tends to become trapped or squeezed between the gear teeth of the intermeshed rotors during the course of a normal rotor rotation cycle. As a result, typical geared oval rotors must have cuts or grooves formed in the gear teeth to allow this trapped fluid to escape. Unfortunately, such relief cuts or grooves in the teeth necessarily create leakage or unmeasured flow paths between the intermeshed rotors and consequently results in flow measurement inaccuracies.

Therefore, there remains a need for a practical and economical oval rotor type, positive displacement flow meter which efficiently meters the fluid flowing therethrough, while minimizing leakage or unmeasured flow between the articulating rotor surfaces.

SUMMARY OF THE INVENTION

The present invention entails a dual rotor positive displacement flow meter that includes a pair of non-intermeshing spaced apart smooth surface rotors that are disposed within a flow chamber. The rotors are interconnected by a pair of intermeshing timing gears that are disposed exteriorly to the flow chamber. In use, a liquid is directed through the flow chamber and the engagement of the liquid with the spaced apart rotors causes the rotors to rotate and in the process the passing liquid is metered between the walls of the flow chamber and the outer surfaces of the rotors. The rotors are spaced apart such that the viscous qualities of the liquid form a liquid seal between the rotors and therefore liquid is generally prohibited from flowing between the rotors.

In the preferred embodiment disclosed herein, the dual rotor flow meter includes a housing having an internal chamber along with an inlet and outlet formed therein for permitting liquid to flow into, through and out the internal chamber of the housing. The pair of rotors is rotably mounted within the chamber and rotate in response to a liquid passing through the chamber. In this embodiment, the rotors have a generally oval shape cross section and include, as pointed out above, smooth non-intermeshing outer surfaces. Disposal exteriorly of the internal chamber is a pair of oval shaped intermeshing timing gears, with each timing gear being connected to a respective rotor. To separate the timing gears from the internal chamber, the housing structure includes a separator plate that separates the timing gears from the rotors disposed within the internal chamber. A flow sensor mechanism is disposed above the internal chamber for effectively sensing the rotation of the rotors and providing an output signal that indicates the flow rate of the liquid passing through the internal chamber.

It is therefore an object of the present invention to provide a dual rotor flow meter that overcomes the disadvantages and drawbacks of conventional flow meters that employ gear-type rotors.

A further object of the present invention is to provide a dual rotor flow meter than includes a pair of spaced apart non-intermeshing rotors.

Still, a further object of the present is to provide a dual rotor flow meter of the character referred to above that provides for the creation of a liquid seal between the spaced apart rotors that effectively prohibits liquid flowing through the flow meter from flowing between the spaced apart rotors.

Other objects and advantages of the present invention will become apparent and obvious from the study of the following description and the accompanying drawings, which are merely illustrative of the present invention.

BRIEF DESCRIPTION OF THE DRAWINGS

FIG. 4 is a fragmentary, exploded view illustrating the orientation of the rotor, timing gear, and magnetic star gear.

FIGS. 7a–7d are a sequence of views showing the relative orientation of the rotors at various times during a single cycle of rotation.

DETAILED DESCRIPTION OF THE INVENTION

Figure 1:
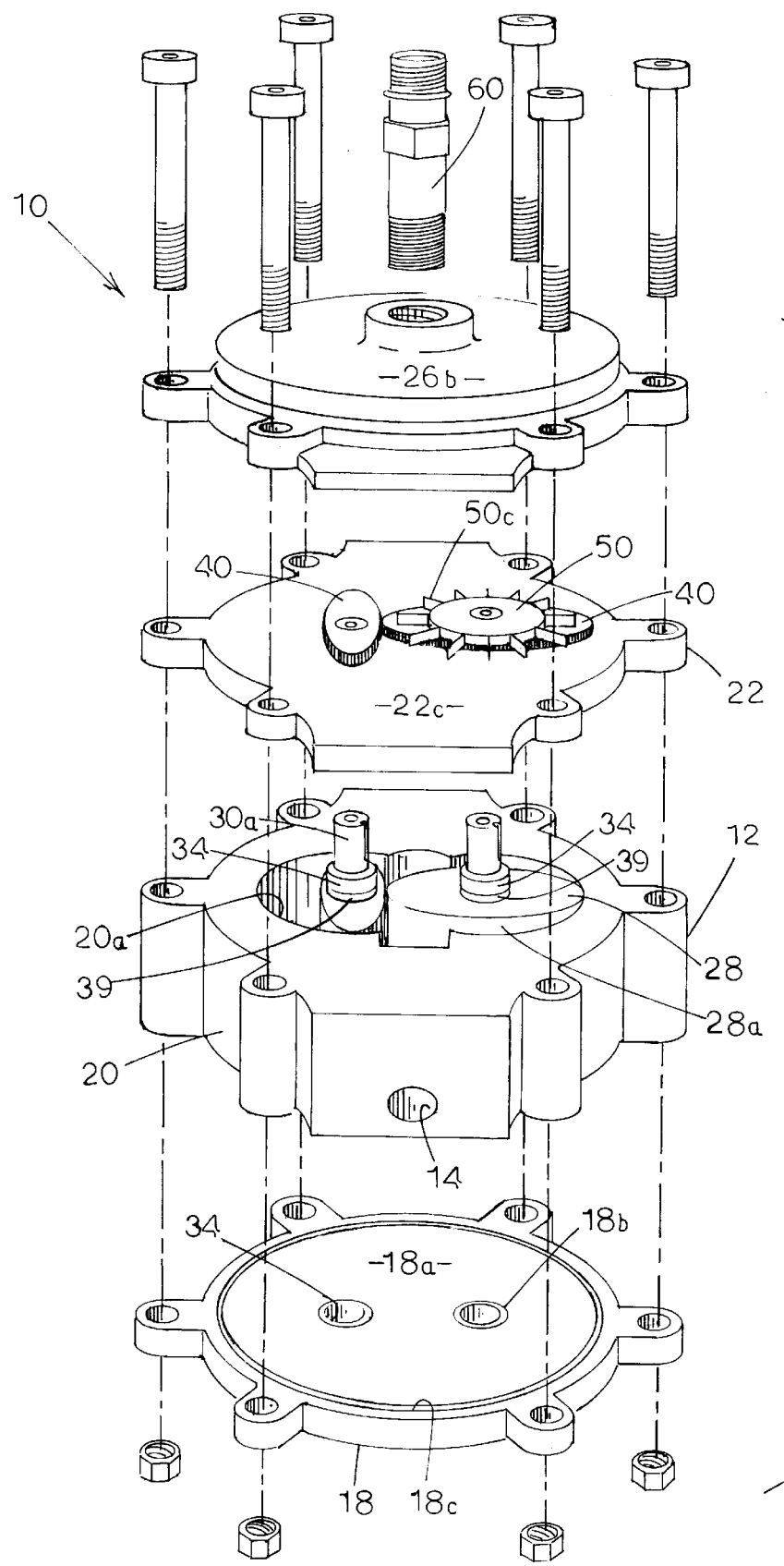
FIG. 1 is an exploded, perspective view of the positive displacement, rotor type flow meter of the present invention.
Figure 3:
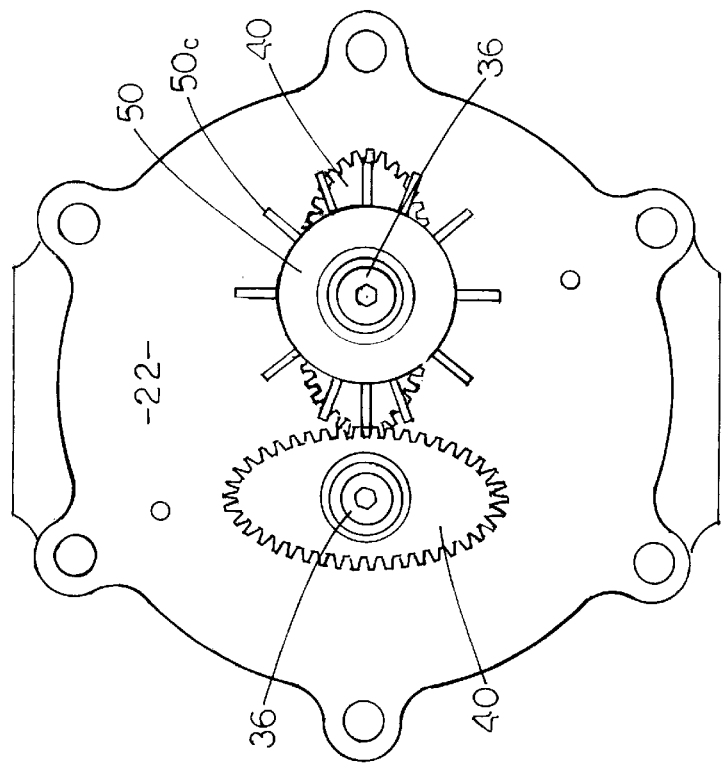
FIG. 3 is a top plan view of the positive displacement, rotor type flow meter of the present invention generally illustrating the oval timing gears and the magnetic star gear.
Figure 2:
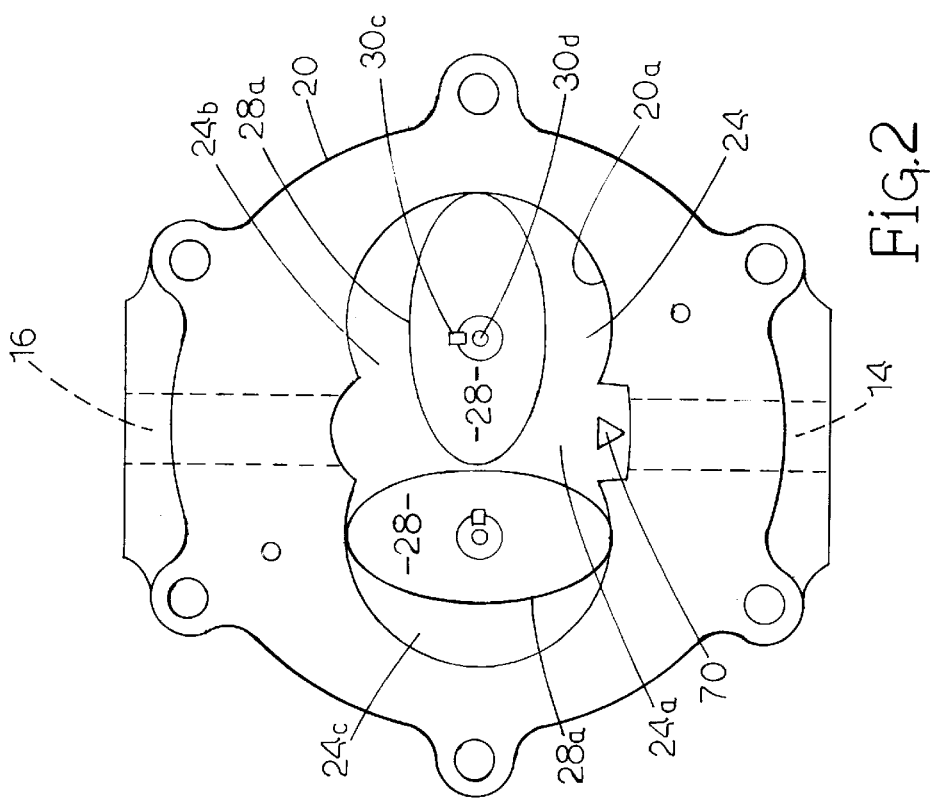
FIG. 2 is top plan view of the positive displacement, rotor type flow meter of the present invention generally illustrating the measurement chamber and the oval shaped rotors contained therein.

Shown in FIGS. 1–3 is a positive displacement, oval rotor flow meter of the present invention, generally indicated by the numeral 10. Flow meter 10 is comprised of a housing, generally indicated by the numeral 12, which includes a inlet 14 and an outlet 16 for directing the metered fluid into and out of the housing. Disposed so as to form the lower surface of the housing 12 is a bottom plate 18, which includes an internal surface 18a. Formed on the internal surface 18a of the bottom plate 18 are a pair of spaced apart bearing cavities 18b, and a circumferential O-ring groove 18c, as generally illustrated in FIG. 1.

Housing 12 is further comprised of a chamber sleeve 20 which is disposed adjacent and above the bottom plate 18, and which further includes a specially contoured inner wall 20a. It will be appreciated from FIG. 2 that the fluid inlet and outlet appetures 14 and 16, respectively, penetrate the inner wall 20a, thus facilitating the flow of fluid generally through the chamber sleeve 20. The chamber sleeve 20 is generally secured and sealed to the bottom plate 18 by a series of connecting bolts. However, it should be appreciated that the chamber sleeve and bottom plate assembly described above could be fabricated as a single integral structure through a one-piece machining or molding process.

Figure 6:
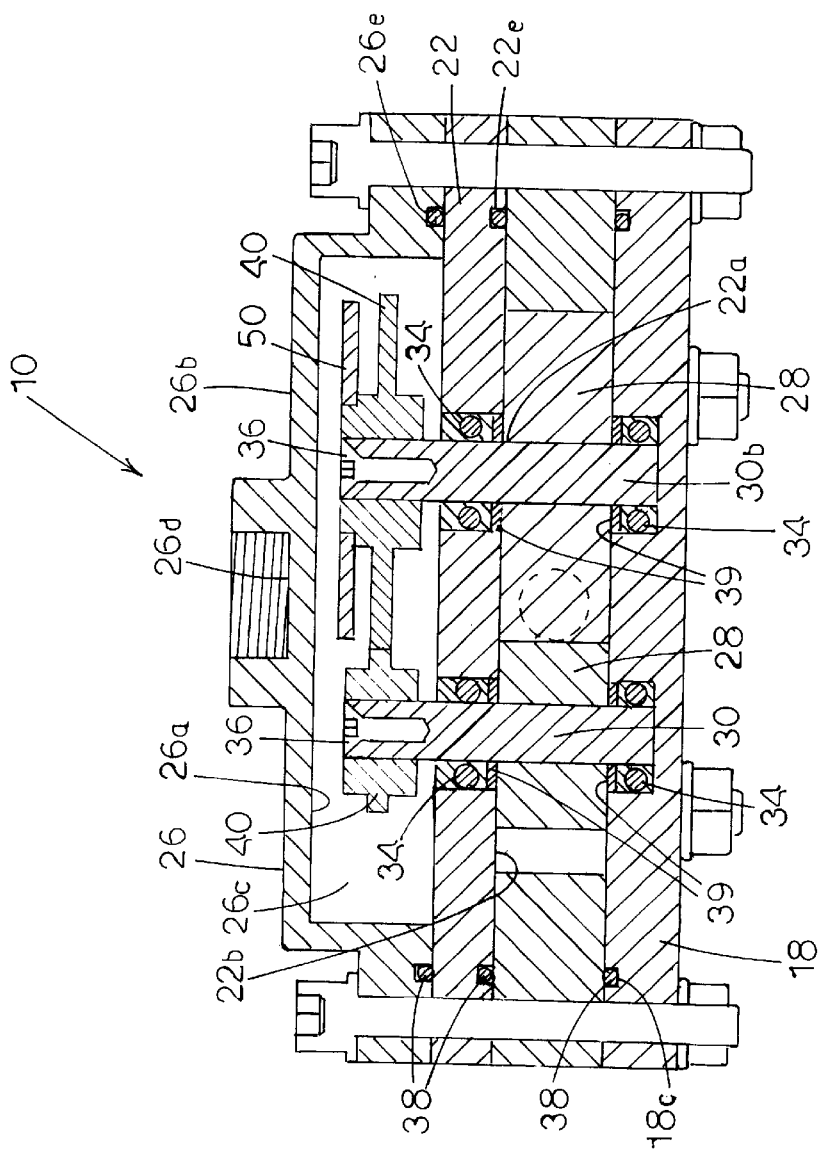
FIG. 6 is a transverse sectional view of the positive displacement, rotor type flow meter of the present invention.

Also comprising the housing 12 and disposed generally adjacent and above the chamber sleeve 20 is a separator plate 22, which includes a pair of spaced apart shaft appetures 22a (FIG. 6). Separator plate 22 further includes an internal surface 22b and an external surface 22c, wherein the internal surface 22b includes a circumferential O-ring groove 22e.

When properly aligned and assembled, the bottom plate 18, chamber sleeve 20, and separator plate 22 combine to form a generally sealed rotor chamber 24 (FIG. 2). Sealing of the chamber 24 is accomplished via a pair of O-rings 38, which are disposed within the O-ring grooves 18c and 22e formed in the bottom plate 18 and separator plate 22, respectively, as generally illustrated in FIG. 6. Chamber 24 is specifically bounded by the internal surface 18a of the bottom plate 18, the interior wall 20a of the chamber sleeve 20, and the internal surface 22b of the separator plate 22. As mentioned previously, it should be appreciated, as shown in FIG. 2, that the inlet and outlet appetures 14 and 16, respectively, penetrate the interior wall 20a of the chamber sleeve 20 and in doing so are communicatively coupled to the otherwise sealed rotor chamber 24.

Disposed generally adjacent and above the separator plate 22 so as to form the upper surface of the housing 12 is a top plate 26 (FIGS. 1 and 6). Top plate 26 includes an internal surface 26a and an external surface 26b, with the internal surface 26a further including a circumferential O-ring groove 26e and defining a gear cavity 26c. Disposed about the external surface 26b of the top plate 26 is a detector seat 26d, which is adapted to receive a magnetic sensor/counter to be described subsequently herein.

Top plate 26, separator plate 22, and chamber sleeve 20 are secured together, such that there is a sealed relationship between the chamber sleeve and the separator plate, through the use of a series of securing bolts. The seal between the top plate 26 and the separator plate 22 is also formed by an O-ring 38, which is disposed generally within the O-ring groove 26e (FIG. 6). In general, the gear cavity 26c is sealed with respect to the adjacent rotor chamber 24, via the O-ring 38 and teflon seals 39. However, in some applications such as the case where lubricating oil is being metered, it is not essential that a sealed relationship be maintained between the gear cavity and the rotor chamber. In such a case, the teflon seals mentioned above are not essential, and in fact as the oil penetrates the gear cavity 26c it will tend to provide beneficial lubrication to both the timing gears 40 and the associated bearings 36 located in the separator plate 22.

Disposed within the rotor chamber 24 is a pair of oval shaped rotors 28. Each rotor 28 includes a generally smooth external surface 28a. As illustrated in FIGS. 1 through 4, each rotor 28 is secured to a generally cylindrical, elongated shaft 30 which includes a top end 30a and a bottom end 30b. Once again, it should be appreciated that the two piece rotor-shaft assembly described above could be fabricated as a single integral structure through a one-piece machining or molding process. Formed about the top end 30a of the rotor shaft 30 is a keyway groove 30c which is adapted to receive a key 32, as shown in FIG. 4. Also formed in the top end 30a of the rotor shaft 30 is a threaded screw appeture 30d which is adapted to receive a retaining screw 36, as is again shown in FIG. 4.

Each oval rotor 28 and associated shaft 30 is adapted to be received within the rotor chamber 24, wherein the upper region of each shaft 30 is rotatably mounted within the shaft appeture 22a of the separator plate 22 via a shaft bearing assembly 34. A seal 39 (such as a teflon seal) is positioned on the shaft 30, generally between the bearing assembly 34 and the rotor chamber 24 so as to seal against fluid leakage through the shaft appeture 22a. The bottom end 30b of each shaft is rotatably mounted within the bottom plate 18 via a shaft bearing assembly 34 which is secured in the corresponding bottom plate bearing cavity 18b. Once again, positioned on the shaft 30, generally between the bearing assembly 34 and the rotor chamber 24 is a seal 39, which effectively seals against fluid leakage through the bottom plate bearing cavity 18b. In practice, the shaft bearing assemblies referred to above would typically be press fit into the associated bearing appetures or cavities prior to final assembly of the housing. While various types of bearing assemblies may be employed to satisfy the functional design requirements of the flow meter, ball bearing type assemblies are contemplated in the preferred embodiment described herein.

Mounted as such, the upper most region, and necessarily the top end 30a, of the rotor shaft extends generally upward through separator plate appeture 22a, the bearing assembly 34, and the teflon seal 22e disposed therein, and protrudes into the gear cavity 26c formed in the top plate 26, as illustrated in FIG. 6. Furthermore, once mounted within the housing 12, the oval rotors 28 are initially oriented such that when the major axis of one of the oval rotor's is aligned horizontally, the major axis of the other oval rotor is aligned vertically, as is generally illustrated in FIG. 2.

Disposed within the gear cavity 26c is a pair of toothed, intermeshing timing gears 40, with each timing gear including a shaft appeture 40a and a keyway groove 40b which is formed therein (FIG. 4). Each timing gear 40 is adapted to receive and be secured to the upper end of a rotor shaft 30 via the shaft appeture 40a. Coupling of the timing gear 40 to the associated shaft 30 is accomplished via the use of the shaft key 32, as indicated in FIG. 4. With the shaft keyway groove 30c and gear keyway groove 40b properly aligned, a keyway appeture is formed and the shaft key 32 is inserted therein. Insertion of the key 32 effectively couples the gear and shaft, forcing the two to rotate together as a single unit. Following insertion of the shaft key 32, the retaining screw 36 is applied to screw appeture 30d in the top end 30a of the shaft so as to prevent the shaft key 32 from backing out of the key appeture, and also to prevent the adjacent timing gear 40 from sliding off the shaft 30.

As shown in FIG. 4, a magnetic star type gear 50 is additionally adapted to be secured to one of the shafts 30, in a manner similar to that described above. That is, the magnetic gear 50 includes a shaft appeture 50*a* and a keyway groove 50*b*, just as with the timing gears 40. The shape of the magnetic star gear 50 is generally circular, with a series of spaced apart magnetic or magnetic tipped radial protrusions 50*c*, which extend generally outward from the gear center. Furthermore, the angular spacing between the protrusions 50*c* is non-uniform. In the embodiment shown in FIG. 5, the angular spacings A, B, and C between the individual radial protrusions 50*c* are configured as 40, 30, and 20 degrees, respectively. This angular of for the radials 50*c* is repeated quarterly around the star gear 50.

The shaft appeture 50*a* and keyway groove 50*b* features are utilized in much the same manner as described above with regard to the timing gears 40 to achieve a similar coupling of the magnetic gear 50 to the shaft 30. As indicated in FIG. 4, the magnetic gear 50 is typically attached to the shaft 30 following placement and positioning of the associated timing gear 40. Insertion of the key 32 effectively couples the magnetic gear 50 to the shaft 30, forcing the two to rotate together, just as the key 32 forces the timing gear 40 to rotate with the shaft 30. Consequently, the magnetic gear 50 and the associated timing gear 40 are also effectively coupled together, and hence rotate together.

It will be appreciated from FIGS. 3 and 4, that the timing gears 40 described above are secured to the shafts 30 and contained within the gear cavity 26*c* formed in the top plate 26. It is also worth re-emphasizing that this gear cavity 26*c* is located external to the rotor chamber 24, and hence the contents of the gear cavity 26*c* do not generally come into direct contact with the fluid being metered.

In a preferred embodiment, the timing gears 40 are generally identical in size and shape to the corresponding oval rotors 28, with the exception of gear teeth which are disposed about the surface of the gears 40. Once mounted on a shaft 30 within the housing 12, each oval timing gear 40 is initially oriented so as to match the orientation of the associated oval rotor 28 which is attached to the same shaft 30, as is shown in FIGS. 2 and 3. When properly installed and aligned the teeth of the two adjacent oval timing gears intermesh and are responsible for maintaining proper relative orientation of the two internally disposed oval rotors at all times during the rotational cycle.

Proper relative orientation of the two internally disposed oval rotors insures that a small gap is maintained at substantially all times between the smooth rotor faces at their point of interface or articulation. As such, an effective fluid seal is generally formed between the rotors at their point of articulation, thus unwanted leakage of fluid between the two smooth faced oval rotors is minimized and ideally eliminated. Furthermore, a similar small gap and effective fluid seal is maintained between each rotor 28 and the adjacently disposed interior wall 20*a* of the chamber sleeve 20. In practice, for fluids having a viscosity of 50 centipoise or greater, the small gaps described above are typically in the range of 0.002 inches. Furthermore, normal operation of the intermeshed timing gears 40 typically involves a certain amount of gear backlash, which may result in sporadic fluctuations in spacing between the rotors. Therefor, it is possible that brief contact of the two rotors may occur periodically during the course of a normal cycle of rotor rotation.

As a consequence of the fluid seals described above, the rotor chamber 24 is effectively divided generally into two sealed compartments or plenums by the rotors 28 disposed therein, an inlet plenum 24*a* and an outlet plenum 24*b*, as shown in FIG. 2. The inlet plenum 24*a* is communicatively coupled to the housing inlet 14, while the outlet plenum 24*b* is similarly coupled to the housing outlet 16. It should be noted that as the rotors 28 rotate about their respective shafts 30 during the course of a normal rotational cycle, the shape or geometry of the plenums 24*a* and 24*b* will vary, however, at no time during the cycle are the two plenums in direct communication. This general concept is illustrated in FIGS. 7*a* through 7*d*. The rotor-to-rotor and rotor-to-wall fluid seals described above prevent any direct coupling or communication of these two plenums. The two plenums 24*a* and 24*b* do, however, remain in constant communication with the inlet 14 and outlet 16. Furthermore, at various points during the rotational cycle, a crescent shaped metering plenum 24*c* is periodically formed between the smooth surface 28*a* of the rotor 28 and the interior wall 20*a* of the chamber sleeve 20, as generally illustrated in FIG. 2.

In an alternate embodiment the rotor chamber 24 can be configured so as to contain a deflector element 70 such as that shown in FIG. 2. As so oriented the deflector 70 will function to divert incoming fluid outwardly towards the opposite side of the inlet plenum 24*a*, and at the same time will tend to discourage the flow of fluid directly to the articulation point of the two rotors 28.

FIGS. 7*a* through 7*d* generally illustrate the dynamic operation of the oval flow meter 10 of the present invention. During the course of normal operation, the fluid being metered flows under pressure into the housing 12 via the inlet 14. Inlet 14 directs this in-flowing fluid through the wall of the chamber sleeve 20 and generally into the inlet plenum 24*a* formed in the rotor chamber 24. As fluid enters the inlet plenum 24*a*, it eventually contacts the exposed surfaces 28*a* of the two rotors 28 disposed therein. As a consequence of the fluid seal formed at the articulation point of the two rotors, the fluid is not permitted to flow directly between the rotors and across to the adjacent outlet plenum 24*b*. Instead, the fluid is general confined within the inlet plenum 24*a* and as such necessarily applies a force to the surfaces 28*a* of the rotors which are exposed to the inlet plenum 24*a*. In a similar manner, the fluid residing in tie outlet plenum 24*b* also applies a force to the surfaces 28*a* of the rotors which are exposed to the outlet plenum 24*b*. It should be appreciated and it is key to understanding the operational mechanics of the positive displacement flow meter 10, that a pressure drop occurs between the inlet 14 and the outlet 16. That is, the pressure of the fluid in the inlet plenum 24*a* is necessarily higher than the pressure of the corresponding fluid in the outlet plenum 24*b*.

Given this disparity in inlet and outlet pressures, it will become apparent through consideration of FIGS. 7*a* through 7*d* that the forces applied by the incoming and outgoing fluid are generally not uniform across the entire exposed surface of either rotor 28. As such, it will be appreciated that the non-uniform distribution of force across the smooth rotor surface 28*a*, generates a rotational moment about the associated shaft 30. That is, the non-uniform distribution of force across the rotor surface 28*a* results in a net or effective force which acts so as to generally cause the rotor 28 and associated shaft 30 to rotate, as is illustrated in the sequence of FIGS. 7*a* through 7*d*.

It should be noted that when the major axis of one oval shaped rotor is exactly aligned with the minor axis of the other oval shaped rotor, the net force acting to cause rotation of the rotor with the appropriately aligned major axis may, in fact, be at or near zero. However, under such conditions, the rotor with the appropriately aligned minor axis will simultaneously experience a maximum net rotational force.

In general, during a normal rotation cycle, as the net rotational force experienced by one rotor decreases towards a minimum value, the net rotational force experienced by the remaining rotor increases towards a maximum value. Thus, there is an effective conservation of net rotational force in this dual rotor system and, given that the two rotors 28 are effectively coupled together by externally located timing gears 40 as described previously, they assist one another in rotating as there is always at least one rotor experiencing a net rotational force that is greater than zero.

In addition to coupling the two rotors 28 together so that they might assist one another with regard to the net rotational forces discussed above, the timing gears 40 also serve the important function of maintaining proper relative orientation of the internally disposed rotors 28 at all times as they rotate about their respective shafts 30. As discussed previously, such orientation is crucial to the establishment and maintenance of a fluid seal at the articulation point of the two rotors, which in turn insures that little to no leakage of fluid from the inlet plenum 24a to the outlet plenum 24b occurs between the two articulating rotor surfaces 28a.

As such, the only inlet-to-outlet transport path available to fluid confined in the inlet plenum 24a is via the crescent shaped metering plenum 24c (FIG. 2) that is periodically formed between the surface 28a of a rotating oval shaped rotor 28 and the interior wall 20a of the chamber sleeve 20, as generally indicated by FIGS. 7a–7d. It should be noted that a unit volume of fluid represented by a filled circle, is included in the series of FIGS. 7a–7d for illustrative purposes, in order to better demonstrate the general fluid flow sequence through the rotor chamber 24 of the flow meter 10. As indicated by the flow arrows, fluid is assumed to enter the inlet plenum 24a through the inlet 14 and exit the outlet plenum 24b through the outlet 16.

Beginning with FIG. 7a, it is seen that upper and lower rotors 28 are oriented relative to each other such that there is a net force caused by the pressure differential between the fluid in the inlet and outlet plenums 24a and 24b, respectively, which results in a generally clockwise rotation of the upper rotor and a generally counterclockwise rotation of the lower rotor. As the upper rotor 28 rotates clockwise, the major axis of the oval shaped rotor necessarily approaches a horizontal orientation, as illustrated in FIG. 7b. It will be appreciated, that as the upper rotor rotates clockwise from the orientation shown in FIG. 7a to the horizontal orientation shown in FIG. 7b, fluid in the inlet plenum 24a flows into the void that develops between the upper rotor and the adjacent chamber sleeve wall 20a. As the upper rotor reaches the horizontal orientation shown in FIG. 7b, the rotor-to-wall void is fully developed and is completely isolated from both the inlet plenum 24a and the outlet plenum 24b via a fluid seal, which is similar in nature to those previously discussed herein. This fully developed void or plenum 24c assumes a generally crescent shape, as shown in FIG. 7b, and is designed so as to contain a precisely known volume of fluid. Proceeding on to FIG. 7c, it can be seen that as the upper rotor continues to rotate past the horizontal orientation, the crescent shaped plenum 24c is effectively opened into the outlet plenum 24b, thus allowing the fluid trapped within the plenum 24c to drain generally into the outlet plenum. As the plenum 24c formed by the upper rotor empties it's contents into the outlet plenum 24b and begins to lose shape, the lower rotor begins to approach a horizontal orientation with similar consequences to those discussed above for the upper rotor. It will be appreciated, that as the lower rotor rotates counterclockwise from the orientation shown in FIG. 7c to the horizontal orientation shown in FIG. 7d, fluid in the inlet plenum 24a flows into the void that is develops between the lower rotor and the adjacent chamber sleeve wall 20a. As the lower rotor reaches the horizontal orientation shown in FIG. 7d, the rotor-to-wall void is fully developed and is completely isolated from both the inlet plenum 24a and the outlet plenum 24b via a fluid seal, as discussed previously. As with the void formed by the upper rotor, this fully developed void or plenum 24c assumes a generally crescent shape, as shown in FIG. 7d, and is designed so as to contain a precisely known volume of fluid. Once again, it will be appreciated that as the lower rotor continues to rotate past the horizontal orientation, the crescent shaped plenum 24c is effectively opened into the outlet plenum 24b, thus allowing the fluid trapped within the plenum 24c to drain generally into the outlet plenum.

While the series of FIGS. 7a–7d are complete, in that they generally illustrate the periodic filling and emptying of the crescent plenums 24c formed by the upper and lower rotors, it should be appreciated that this series of figures illustrates only one half of a complete rotation cycle. It follows that in the course of a complete rotation cycle, the upper rotor will fill and empty two crescent plenums, while the lower rotor will also fill and empty two crescent plenums. Thus, one complete cycle of rotation results in the transport of four crescent plenum volumes of fluid from the inlet plenum 24a to the outlet plenum 24b. It should be appreciated that by varying the general contour of the chamber wall 20a and/or the general size and shape characteristics of the oval rotors, crescent plenum volumes can be effectively altered, thus allowing for flow meter designs which can accommodate a wide variety of fluid flow rates.

Figure 5:
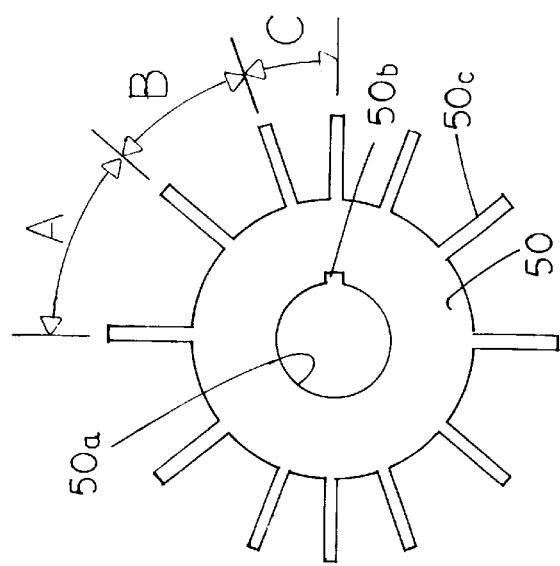
FIG. 5 is a top plan view of the magnetic star gear, illustrating the non-uniform angular spacing of the magnetic radial protrusions.

As one complete cycle of rotation implies one complete rotation of each rotor shaft 30, and as the magnetic star gear 50 is rigidly coupled to one of the shafts 30, it follows that one complete rotation of the magnetic star gear 50 represents a fluid flow through the meter equal to four crescent plenum volumes. As shown in FIG. 5, the magnetic star gear is comprised of a series of twelve non-uniformly spaced magnetic radials 50c, wherein each radial 50c is constructed of or contains a material which exhibits magnetic properties. Thus, as the magnetic star gear 50 rotates through a complete cycle, each of the twelve associated magnetic radials 50c will pass within a close proximity of and be detected by a conventional magnetic sensor/counter 60, which is disposed in the detector seat 26d adjacent the star gear 50. With regard to the detector seat 26d, it should be noted that a complete penetration of the top plate 26 is not necessarily required for operation of the magnetic sensor/counter 60 contemplated in this embodiment. However, other sensor/counter technologies or sensor/counter configurations may, in fact, require a complete penetration of the top plate 26.

Thus, one complete rotation of the magnetic star gear 50 will result in twelve detections by the sensor/counter 60. The non-uniform spacing of the magnetic radials 50c accommodates the relatively non-uniform rotation rate of the shaft 30 and results in a more uniformly spaced temporal series of detection events by the sensor/counter 60. A simple calibration, performed by an external logic controller (not shown) can easily map each detection event, as recorded by the sensor/counter 60, to a known quantity or volume of fluid, and present this information in a digital format as output for further processing by associated equipment. In the particular embodiment shown, each detection event corresponds to a flow volume equal to one half of a crescent plenum volume.

It should also be appreciated that the magnetic sensing/counting systems of the type described above are commonly understood and used in a wide variety of positive displacement flow meters. Furthermore, in addition to the magnetic actuating and sensing means specifically described herein, a variety of other commonly employed actuator/sensor technologies are also available which can effectively and efficiently perform the same function. Optical encoders, for example, are commonly utilized to perform tasks similar to that performed by the magnetic sensing system which is incorporated in the embodiment described above.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A dual rotor flow meter for measuring the flow rate of a liquid passing through the flow meter, comprising:
   a) a housing having an internal chamber;
   b) an inlet and an outlet formed in the housing for permitting liquid to flow into, through and out the internal chamber;
   c) a pair of rotors rotatively mounted within the internal chamber and operative to be rotated by the liquid passing through the internal chamber;
   d) the rotors having a general oval shaped cross-section and including smooth non-intermeshing spaced apart outer surfaces;
   e) a pair of generally oval shaped intermeshing timing gears coupled to the rotors;
   f) the timing gears disposed externally of the internal chamber and separated from the liquid passing through the internal chamber by a separation wall that extends between the rotors and the timing gear; and
   g) a flow sensor mechanism for determining the rotational rate of at least one rotor which is proportional to the flow rate of liquid passing through the internal chamber.

2. The flow meter of claim 1 wherein the separation wall that separates the timing gears from the rotors is formed by a separation plate that forms a part of the housing.

3. The flow meter of claim 1 wherein each rotor includes a shaft and wherein a portion of the shaft extends through an opening in the separator plate; and wherein each timing gear is secured to a portion of a respective shaft extending through the separator plate.

4. The flow meter of claim 3 wherein the housing includes an outer plate disposed adjacent the separator plate, the outer plate and separator plate forming a gear cavity for housing the timing gears.

5. The flow meter of claim 1 wherein the flow sensor mechanism includes a rotating element having a series of spaced apart radials extending therefrom; and a counter disposed adjacent the rotating element for effectively counting the radials passing the counter.

6. The flow meter of claim 5 wherein the rotating element includes at least some magnetic characteristics and wherein the counter includes a magnetic detector that is operative to count the number of radials of the rotating element passing the magnetic detector.

7. The flow meter of claim 5 wherein the rotating element is operative to turn in response to one of the rotors being rotated by the flow of liquid through the internal chamber.

8. The flow meter of claim 1 wherein the rotors are spaced apart such that an opening is formed between the interface of the two rotors as they rotate within the internal chamber.

9. The flow meter of claim 8 wherein the opening between the two rotors is approximately 0.002 of an inch.

10. The flow meter of claim 1 wherein the housing includes a gear cavity that is isolated from the internal chamber, and wherein the gear cavity houses the two timing gears and at least a part of the flow sensor mechanism.

11. The flow meter of claim 10 wherein each rotor includes a shaft and wherein a portion of each shaft extends from the internal chamber into the gear cavity where the timing gears are coupled to the shaft portions; and wherein the flow sensor mechanism includes a rotating element having a series of spaced apart radials and wherein the rotating element is coupled to one shaft portion disposed within the gear cavity.

12. A dual rotor flow meter for measuring the flow rate of a liquid passing through the flow meter comprising:
    a) a housing having an internal chamber;
    b) an inlet and an outlet formed in the housing for permitting liquid to flow into, through and out the internal chamber;
    c) a pair of rotors rotatively mounted within the internal chamber and operative to be rotated by the liquid passing through the internal chamber;
    d) the rotors having outer non-intermeshing surfaces that assume a spaced apart relationship such that a space is defined between the non-intermeshing rotors as they rotate in the internal chamber of the housing; and
    e) a flow sensor mechanism for sensing the rotation of at least one rotor.

13. The flow meter of claim 12 including a pair of intermeshing timing gears disposed externally of the internal chamber and operatively interconnecting the rotors such that the rotors rotate in unison.

14. The flow meter of claim 13 wherein each rotor includes a smooth non-intermeshing outer surface.

15. The flow meter of claim 14 wherein the smooth outer surfaces of the rotors remain spaced apart for a substantial period of each revolution.

16. The flow meter of claim 14 wherein the cross-sectional area of each rotor assumes a generally oval shape.

17. The flow meter of claim 16 wherein each of the timing gears assumes a generally oval shape.

18. The flow meter of claim 17 wherein the housing includes a separation wall that separates the timing gears from the internal chamber and wherein each rotor includes a shaft that includes a shaft portion that projects through the separation wall and connects with a respective timing gear.

19. The flow meter of claim 12 wherein the internal chamber includes inlet and outlet areas with the rotors being disposed generally between the inlet and outlet areas, and wherein the flow meter includes a deflector disposed in the inlet area of the internal chamber.

20. The flow meter of claim 19 wherein the deflector is positioned to direct the liquid passing through the inlet towards the outer sides of the rotors.

21. The flow meter of claim 12 wherein the rotors are spaced apart such that liquids having a given viscosity form a liquid seal between the two spaced apart rotors thereby generally preventing the flow of liquid between the two rotors.

22. The flow meter of claim 12 wherein the rotors are spaced approximately 0.002 inches apart.

23. The flow meter of claim 17 wherein each timing gear is connected to a respective rotor and wherein each timing gear includes a pitch diameter that corresponds in shape and size to the diameter of the connected rotor.

24. A method of metering a liquid comprising: directing a liquid into a chamber having a pair of non-intermeshing rotors rotatively mounted therein; spacing the rotors apart such that an opening is formed between the rotors; driving the rotors by directing the liquid between the outer walls of the chamber and the respective rotors; forming a viscous seal within the opening formed between the rotors and sealing the interface between the rotors such that the liquid is generally prevented from passing between the rotors; and measuring the flow rate of liquid passing the rotors by measuring the revolutions of at least one rotor.

25. The method of claim 24 including interconnecting the two rotors through two intermeshing timing gears disposed externally of the chamber through which the liquid passes.

26. The method of claim 25 including housing the timing gears within a chamber isolated from the chamber through which the liquid flows.

27. The method of claim 24 including spacing the non-intermeshing rotors approximately 0.002 of an inch apart.

28. The method of claim 24 including directing a liquid having a viscosity of at least approximately 50 centipoise through the chamber and wherein the liquid having the viscosity of at least 50 centipoise form a liquid seal between the two spaced apart rotors.

29. The method of claim 24 wherein the non-intermeshing rotors include smooth outer surfaces that in cross-section assume an oval shape.

\* \* \* \* \*